July 18, 1950  T. M. JABLON  2,515,602
ADAPTER FOR SLIDES IN A STILL PROJECTOR
Filed July 13, 1946  4 Sheets-Sheet 1
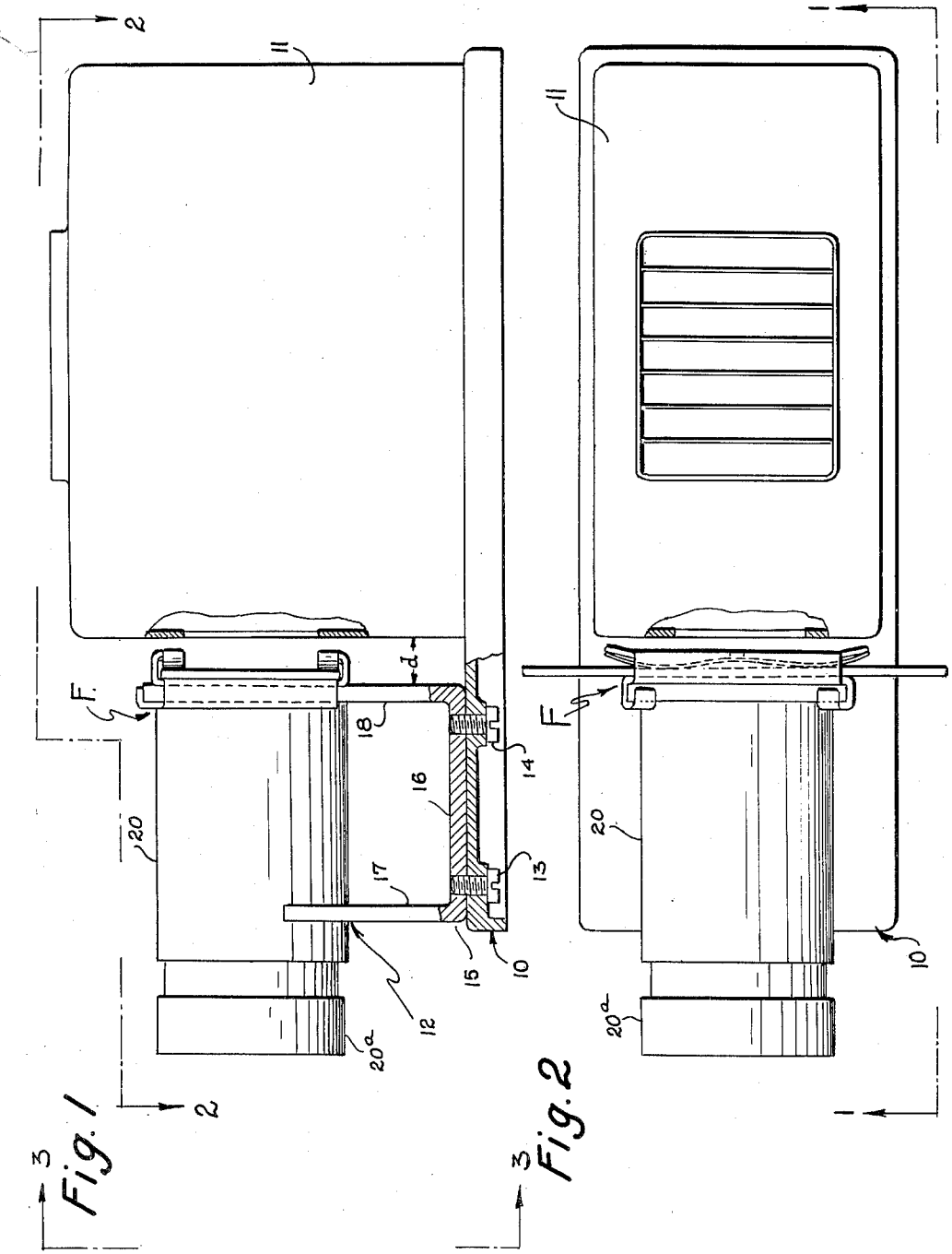
INVENTOR.
BY Theodore M. Jablon July 18, 1950 T. M. JABLON 2,515,602
ADAPTER FOR SLIDES IN A STILL PROJECTOR
Filed July 13, 1946 4 Sheets-Sheet 2
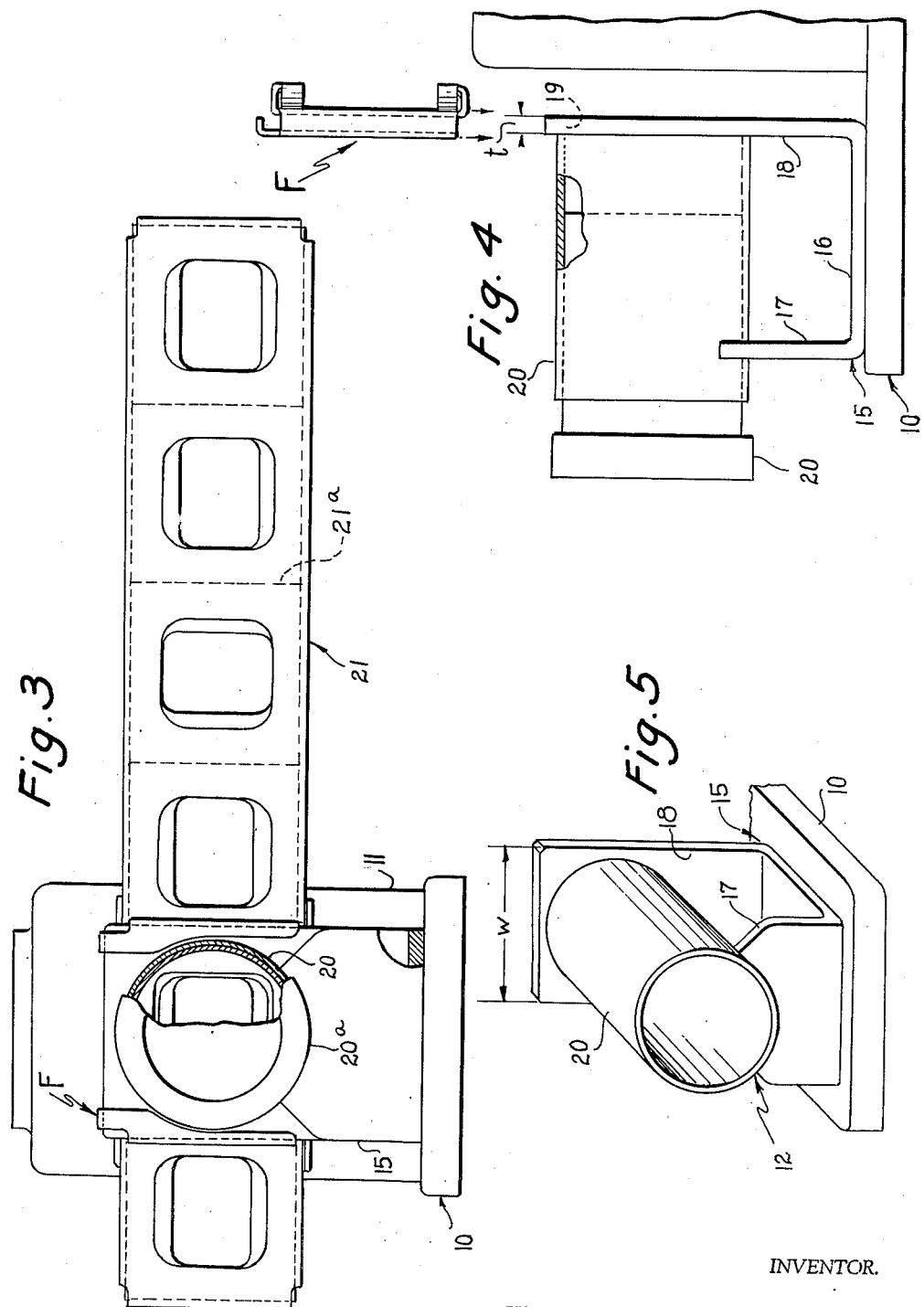
INVENTOR.
BY Theodore M Jablon

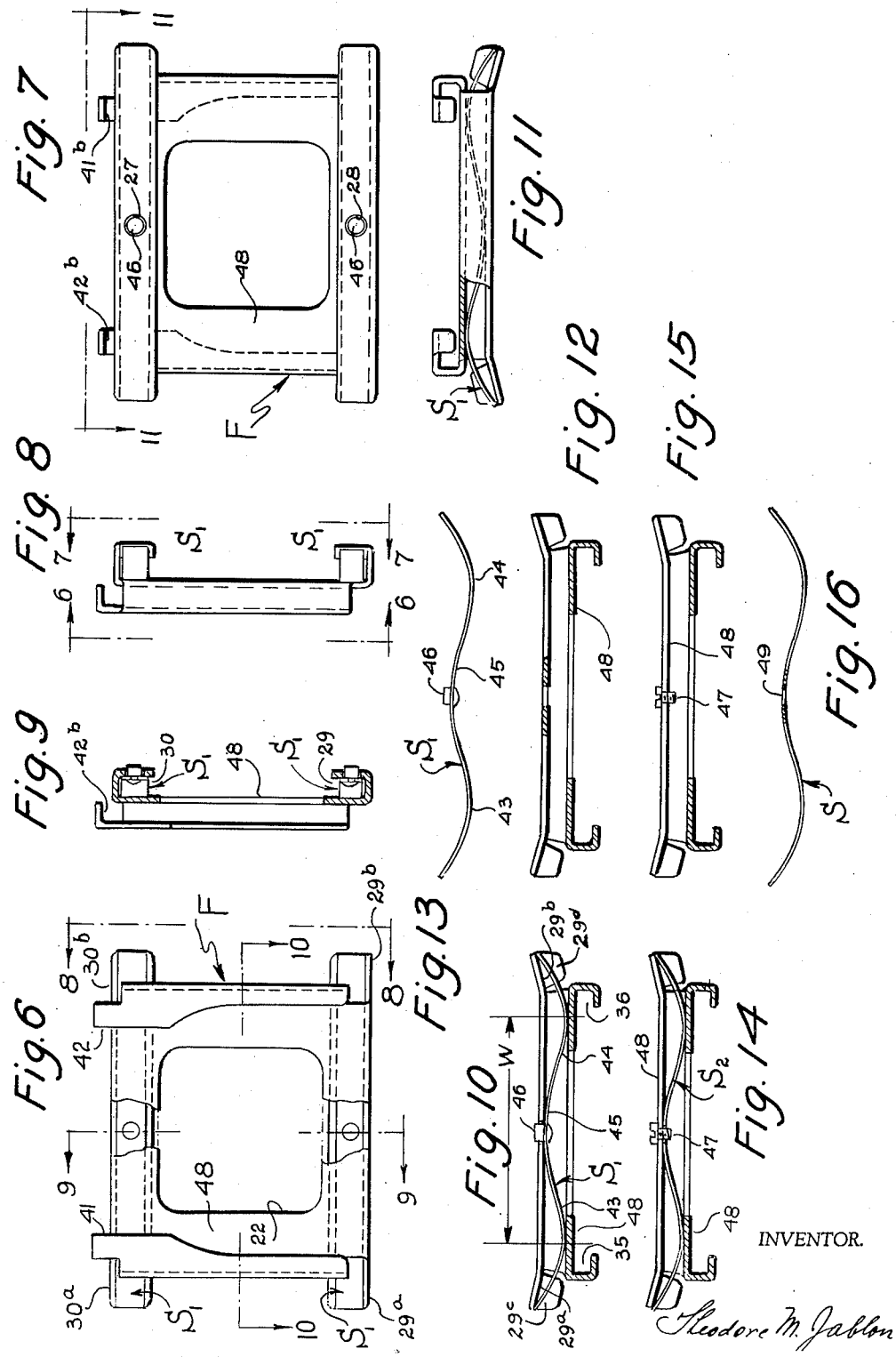

July 18, 1950 — T. M. JABLON — 2,515,602
ADAPTER FOR SLIDES IN A STILL PROJECTOR
Filed July 13, 1946 — 4 Sheets-Sheet 4

INVENTOR.
BY Theodore M. Jablon

Patented July 18, 1950

2,515,602

UNITED STATES PATENT OFFICE 2,515,602

ADAPTER FOR SLIDES IN A STILL PROJECTOR

Theodore M. Jablon, New York, N. Y.

Application July 13, 1946, Serial No. 683,394

4 Claims. (Cl. 88—28)

This invention relates to still projectors for the projection of transparency slides.

Such projectors are used for example for the projection of transparencies of the miniature camera or 35 mm. standard size.

This invention relates more particularly to a projector having a slide-receiving adaptor frame removably mounted between a lamp housing and a lens-carrying structure or lens carrier. For example, in such a projector, a lamp housing and a lens-carrying structure or lens carrier are mounted separately and spaced from each other upon a base, and a slide-receiving adaptor frame is interposed between the lamp housing and the lens carrier.

Further particularized, the lens carrier has a pair of vertical lateral guide portions, one at each side, engageable by corresponding portions of the adaptor frame.

It is one of the objects to provide a slide-receiving adaptor frame for a projector, which is capable, not only of receiving individual slides, but also of having passed therethrough multiple slide-holding strips or multiple slide holders.

Other objects are to provide an adaptor frame of this kind which is compact, simple, and inexpensive.

This invention provides an adaptor frame for the projector, which comprises an apertured body portion, a pair of horizontal slide-receiving marginal grooves along one face of the body portion, slide-engaging spring means associated with the grooves, and means extending from the opposite face of the body portion for attachment to corresponding portions of the projector, and more specifically for the attachment to the lens carrier.

According to one feature, the adaptor frame has a pair of horizontal slide-receiving grooves and slide engaging spring means interengaging with, and retained by, said grooves when being inserted therein.

According to another feature, the adaptor frame is formed marginally with a pair of horizontal slide-receiving groove portions, and with a pair of vertical groove portions to receive corresponding vertical guide portions of the projector or lens carrier, the horizontal and the vertical grooves extending respectively at opposite sides of the apertured body portion of the frame.

According to another feature, the adaptor frame is formed from a single blank with a pair of vertical marginal grooves at one side, and with a pair of complementary horizontal grooves at the opposite side of the apertured body portion.

According to another feature, the slide-engaging spring means comprise a flat spring having a pair of convex slide-engaging portions and between them, a receding or concave portion. The spring and a corresponding horizontal slide-receiving groove of the frame have portions which interengage upon insertion of the spring in the groove retaining the spring operatively in the groove.

The invention possesses other objects and features of advantage, some of which with the foregoing will be set forth in the following description. The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a side view of a projector shown with the adaptor mounted thereon.

Fig. 2 is a plan view of the projector shown in Fig. 1.

Fig. 3 is a front view of the projector showing more fully a multiple slide holder inserted in the adaptor frame.

Fig. 4 is a side view of the lens carrier structure with the adaptor frame about to be applied.

Fig. 5 is a perspective view of the lens carrier structure.

Figs. 6 to 11 are views of the adaptor frame; Fig. 6 being a front view; Fig. 7 a rear view; Fig. 8 a side view; Fig. 9 vertical section; Fig. 10 a horizontal section of the frame; Fig. 11 being a top view of the frame.

Fig. 12 is horizontal section of the frame similar to that in Fig. 10, although without the spring.

Fig. 13 is a top view of the spring per se.

Figs. 14, 15, 16 are views corresponding to Figs. 10, 12, and 13 resp., although presenting a modified mounting of the spring.

Figure 17:
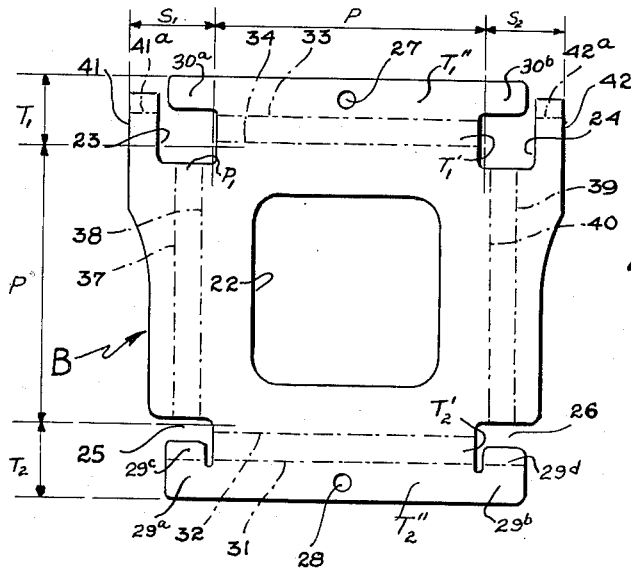

Fig. 17 shows a blank from which the adaptor frame can be bent.

Figure 18:
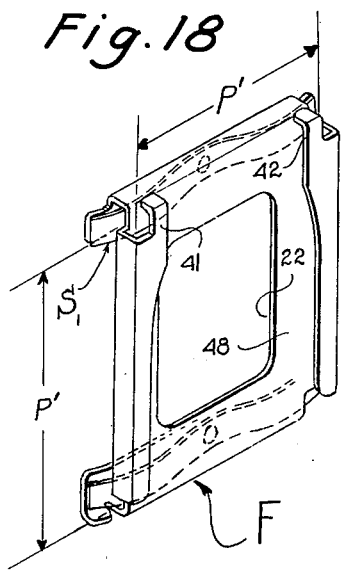
Figure 19:
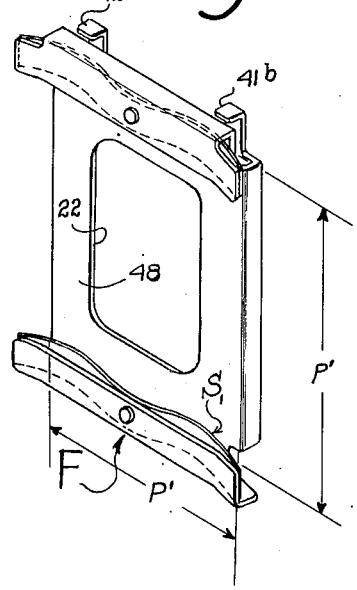

Figs. 18 and 19 are perspective front and rear views of the adaptor frame.

According to Figures 1, 2, and 3, the adaptor frame F, according to this invention, is attached to a still projector comprising a base member 10 upon which is mounted a lamp housing 11 and spaced therefrom a distance $d$ a lens carrying structure or lens carrier 12 shown to be fastened to the base member as by screws 13 and 14.

The lens carrier 12 comprises a U-shaped portion 15 shaped or bent as from flat stock or sheet metal and having a horizontal body portion 16, a shorter vertical shank portion 17, and a longer vertical shank portion 18 providing a pair of vertical guide portions and provided with a circular light passage opening 19. Fixedly connected with the U-shaped portion 15 is a horizontally extending cylindrical or tubular portion 20 in which is telescopically slidable a lens carrying barrel $20^a$.

The vertical shank portion 18 is shown to be of a thickness $t$ and of a width $w$ and capable of having the adaptor frame F slid over it from above, as illustrated in Figure 4. In Figures 1, 2 and 3 the adaptor frame F is shown in place upon the projector and to have inserted therein a multiple slide holder 21 shown to accommodate a series of six slides or frames $21^a$, each being of the 2" x 2" standard frame size containing a 35 mm. transparency.

According to one embodiment (Figures 6 to 19) the adaptor frame F is shown to be formed from a sheet metal blank B (Figure 17) having a square light passage opening 22 with rounded corners, a pair of symmetrically disposed cutouts 23 and 24 at the top and another pair of symmetrically disposed L-shaped cutouts 25 and 26. Centrally, that is, upon the vertical median line of the blank, there is provided a small hole 27 near the top edge, and another small hole 28 near the bottom edge of the blank B.

In order to form the frame, the blank must be bent along the lines indicated in dot-and-dash. Thus, a pair of horizontal slide-receiving grooves 29 and 30 of the frame are formed by bending upon the lines 31 and 32, and upon the lines 33 and 34 respectively. A pair of vertical grooves 35 and 36 to receive the vertical shank portion 18 of the lens carrier is formed by bending upon the lines 37 and 38, and upon the lines 39 and 40 respectively.

This blank B may be defined as comprising a substantially rectangular body portion P, a squat T-shaped portion $T_1$ extending upwardly from the body portion, a squat T-shaped portion $T_2$ extending downwardly from the body portion, and a pair of symmetrical side portions $S_1$ and $S_2$ extending in opposite directions from the body portion. The portion $T_1$ comprises a squat stem portion $T_1'$ embodying the potential lines of bending 34 and 35, and a transverse- or beam- or head portion $T_1''$ embodying the horizontal extensions $30^a$ and $30^b$.

The portion $T_2$ comprises a squat stem portion $T_2'$ embodying the potential bending lines 31 and 32, and a transverse beam- or head portion $T_2''$ embodying the horizontal extensions $29^a$ and $29^b$.

The side portion $S_1$ comprises a body portion $S_1'$ embodying the potential bending lines 37 and 38, a vertical tongue portion or finger 41 which extends upwardly from the side portions $S_1$ and is horizontally spaced from the upper T-shaped portion $T_1$ and embodies the line of bending $41^a$.

Similarly the side portion $S_2$ comprises a body portion $S_2''$ embodying the potential bending lines 39 and 40. A vertical tongue portion or finger 42 extends upwardly from the side portion $S_2$ and is horizontally spaced from the upper T-shaped portion $T_1$ and embodies the potential bending line $42^a$.

In Figures 18 and 19 the body portion of the frame is designated as P' and corresponds to the body portion P of Fig. 17.

The groove 29 has a pair of horizontal extensions or end-tongue portions $29^a$ and $29^b$, which in turn have horizontal bottom tabs $29^c$ and $29^d$ respectively. These extensions $29^a$ and $29^b$ constitute lead-in tongues for passing a succession of slides into and through said horizontal grooves, while the tabs $29^c$ and $29^d$ constitute lead-in bottom guide support for the slides. The groove 30 has a pair of similar horizontal extensions or end tongue portions $30^a$ and $30^b$.

Vertical tongue portions 41 and 42 extending upwardly and constituting part of the respective vertical edge portions of the blank are bent upon the line $41^a$ and $42^a$ respectively, engaging the top edge of the vertical shank portion 18 of the lens carrier and positioning the adaptor frame F thereon.

Each of the horizontal slide receiving grooves of the adaptor frame F has inserted therein a slide-engaging flat spring $S_1$ comprising a pair of convex end portions 43 and 44 and an intermediate concave portion 45. Means for positioning and retaining the spring in its groove comprise, according to the Figures 10, 12, and 13, embodiment of a catch, or protrusion 46, riveted to the spring in the middle thereof and adapted to engage in or snap into the hole 27 or 28 respectively when the spring is being inserted into the respective groove. The distance between the peaks of the convex portions is designated as W, the peaks being the points of frictional contact with slides passing through the adaptor frame.

The ends of the springs S', are co-extensive with and adapted to engage upon the extensions $29^a$, $29^b$ and $30^a$, $30^b$, respectively and hence these springs extend beyond the ends of their respective grooves.

According to the Figures 14, 15, and 16, embodiment a protrusion or catch 47 extends from the inner face of each of the horizontal grooves facing the body portion 48 of the adaptor frame. This catch is shown to be in the form of a screw, the free end of which forms a protrusion adapted to engage in a hole 49 of spring $S_1$ when the same is being inserted in the groove.

According to the Figures 20 to 25 embodiment a spring $S_3$ has no protrusion or special catch or hole but is endwise confined by pockets 50 and 51 respectively formed upon the adaptor frame into which pockets the spring may be inserted or snapped.

According to the Figures 26 to 29 embodiment the positioning and retaining means for the spring $S_4$ consist in a hook-shaped portion 52 and 53, one at each end of the spring, which engage over the ends of respective tongue-like end portions or extensions or tabs 54 and 55 of a horizontal slide-receiving groove 56. While the spring is thus secured against undue longitudinal displacement, it is retained against transverse displacement by bent-over or secondary tabs 57 and 58 extending from the tongues or tabs 54 and 55 respectively.

I claim:

1. For attachment to the fixed portion of a projector having a pair of vertical guide portions, an adaptor frame for slides, having a flat substantially rectangular body portion with light passage opening therein, a pair of vertical grooves facing each other at one face of said body portion for receiving said vertical guide portions, and an upper and a lower horizontal slide-receiving groove at the other face of said body portion, each horizontal groove having an outer wall portion spaced from said other face of the body portion, said vertical grooves having an effective length limited by and not greater than the height of said body portion, said horizontal grooves having a length limited by and not greater than the width of said body portion, said outer wall portion of each horizontal groove having protruding end portions extending horizontally beyond the ends of the horizontal grooves and beyond the width of said body portion to constitute lead-in guide tongues for passing a succession of slides into and through said horizontal grooves, each of the two lower lead-in tongues having a tab extending from the lower edge thereof and substantially extending in alignment with the bottom of the lower groove to constitute lead-in bottom guide support for said slides.

2. An adaptor frame according to claim 1, in which each vertical groove comprises an outer wall portion spaced from said one face of the body portion, each such outer wall portion having at its upper end a finger extending upwardly beyond the end of said vertical grooves and formed with an inwardly bent-over end portion constituting a stop, both stops being engageable upon the top of said fixed portion for positioning said adaptor frame thereon.

3. An adaptor frame according to claim 1, with the addition of a flat spring positioned in each slide-receiving groove for frictionally engaging a slide, said spring being triple-flexed comprising an intermediate concavely flexed portion bulging away from said body portion and convexly flexed end portions bulging towards said body portion, and positioning- and retaining means for each spring for removably holding the same in its groove.

4. An adaptor frame according to claim 1, with the addition of a flat spring positioned in each slide-receiving groove for frictionally engaging a slide, said springs being triple-flexed comprising an intermediate concavely flexed portion bulging away from said body portion and convexly flexed slide-engaging end portions bulging towards said body portion and extending beyond their respective grooves proper and adapted to engage upon the respective protruding end portions of the outer walls of said grooves, and positioning- and retaining means for each spring for removably holding the same in the groove.

THEODORE M. JABLON.

REFERENCES CITED

The following references are of record in the file of this patent:

UNITED STATES PATENTS

| Number | Name | Date |
|---|---|---|
| 749,048 | Force | Jan. 5, 1904 |
| 893,714 | Finch | July 21, 1908 |
| 1,196,924 | Bothwell | Sept. 5, 1916 |
| 1,728,589 | Barron | Sept. 17, 1929 |
| 1,774,563 | Parsons et al. | Sept. 2, 1930 |
| 1,901,819 | Oschwald | Mar. 14, 1933 |
| 1,931,210 | Steinacher | Oct. 17, 1933 |
| 1,943,673 | Hudson | Jan. 16, 1934 |
| 1,949,067 | Wheelock et al. | Feb. 27, 1934 |
| 2,203,376 | Witte | June 4, 1940 |
| 2,276,735 | Miller | Mar. 17, 1942 |
| 2,335,326 | Walter | Nov. 30, 1943 |
| 2,364,627 | Fassin | Dec. 12, 1944 |

FOREIGN PATENTS

| Number | Country | Date |
|---|---|---|
| 616,921 | France | Nov. 6, 1926 |